Patented Oct. 29, 1946

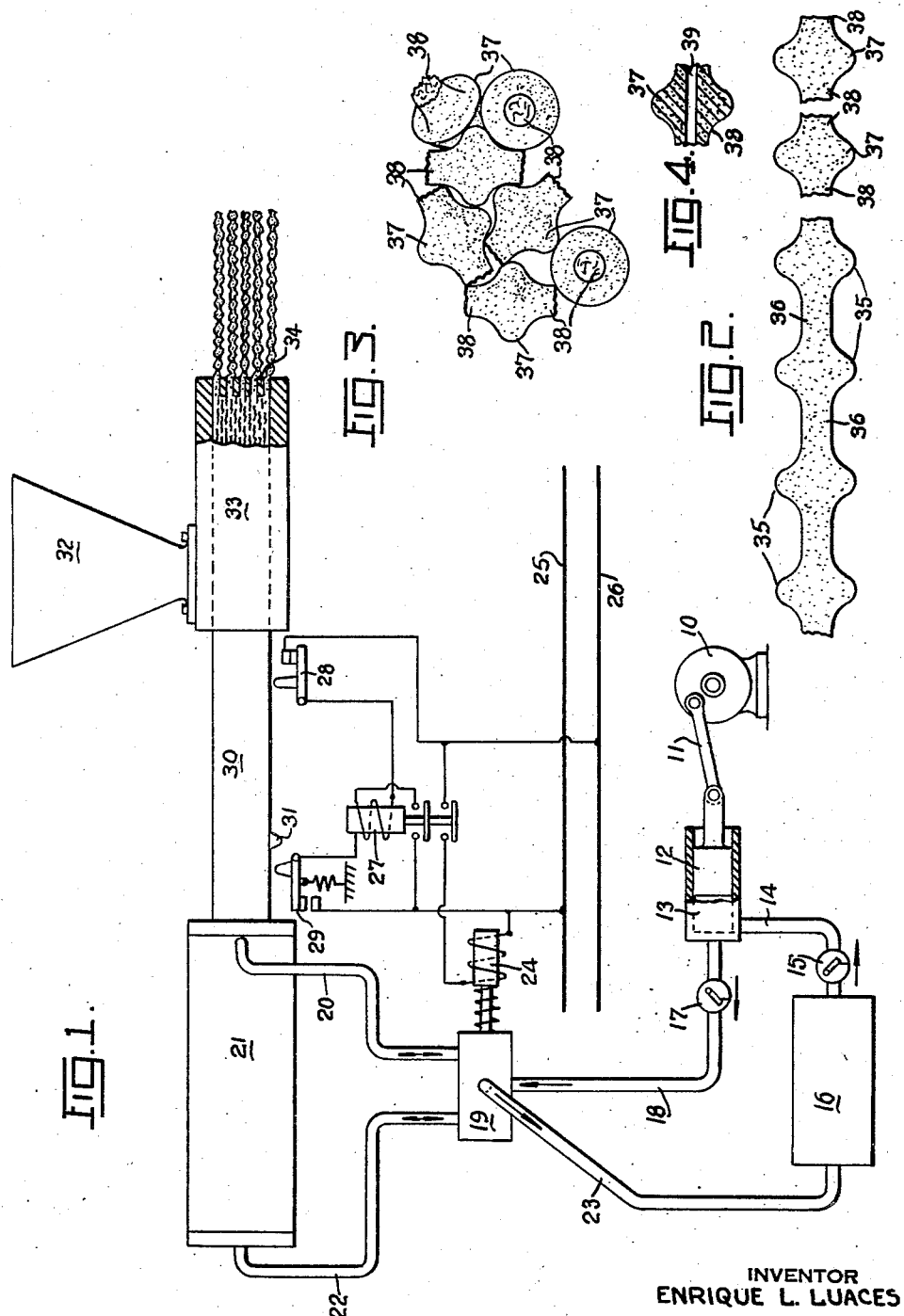

2,410,035

UNITED STATES PATENT OFFICE 2,410,035

EXTRUSION APPARATUS

Enrique L. Luaces, Dayton, Ohio, assignor to Chemical Developments Corporation, Dayton, Ohio, a corporation of Ohio Original applications May 26, 1943, Serial No. 488,533, and December 13, 1943, Serial No. 514,036. Divided and this application July 19, 1944, Serial No. 545,617

4 Claims. (Cl. 18—12)

This application is a division of copending applications Serial No. 488,533 filed May 26, 1943, and Serial No. 514,036 filed December 13, 1943.

This invention relates to extruded carbon, and more particularly deals wtih a method and apparatus for producing an extruded carbon material which is particularly well adapted for use as contact mass in adsorption and catalytic processes, and with the product resulting therefrom.

The method and apparatus of the present invention may be used advantageously in the manufacture of extruded irregularly shaped rods of activated carbon, and the product thus obtained may be employed to good advantage in apparatus for solvent recovery, for extraction or separation of adsorbable vapors from gaseous media, for the treatment of liquids and solutions to remove impurities therefrom, and as a catalyst in organic reactions such as the production of carbonyl chloride or phosgene from carbon monoxide and chlorine.

Activated carbons of commerce may be in the form of fine powders or in the form of granules and agglomerated masses of definite shape. The powdered materials are employed primarily in the treatment of liquids and solutions by the so-called "contact process," while the granular materials are primarily employed for the treatment of gases and vapors and other airform bodies. To a lesser extent the granular or agglomerated carbons are employed for the treatment of liquids by the so-called "percolation process."

Granular carbons used in the treatment of gases and vapors and other airform bodies, because of the conditions of service imposed on them, are required to be hard and nonbrittle. Such carbons are generally obtained using coconut shell and fruit pit charcoals as raw materials, and the commercial product is in the form of granules of the desired mesh size.

Since coconut shells and fruit pits are obtainable in quantity only in certain localities, activated carbons suitable for the treatment of gases and vapors and other airform bodies are frequently made from wood charcoal by grinding the charcoal, mixing it with a suitable binder, extruding the mixture to form rods of the desired size and shape (generally short cylinders the length of which may vary from two to three times the diameter), and then subjecting the rods to an activation process by any of the methods well known to those skilled in the art. The agglomerated carbon masses or particles thus produced resemble short lengths of spaghetti, and while generally solid, may be provided at times with a small opening or channel centrally disposed along the longitudinal axis of the particle. Such particles possess a smooth and even surface contour.

According to the present invention, charcoal in powder form is mixed with a binder and extruded in the usual manner; however, the source of pressure actuating the extrusion mechanism is pulsating and not steady, and the extruded carbon rod thus produced comprises substantially equidistantly spaced protrusions the distance between which will depend on the frequency of the pulsations of the pressure source actuating the extrusion mechanism.

The extruded carbon rods thus produced are broken up by tumbling in a drum or by any other suitable means and then subjected to activation in the usual manner. As the rods are broken, the fracture will be invariably at the weak points between the protrusions, and the resulting carbon particles will be knob-like in shape. If desired, the rod may be provided with a central opening to permit a more rapid permeating of the particle by the gaseous or airform bodies coming into contact with the carbon particles in use.

The present invention will be fully understood from the following description taken in connection with the annexed drawing, wherein:

Fig. 1 is a diagrammatic view of an apparatus such as may be used advantageously in the practice of the method of this invention;

Fig. 2 diagrammatically represents the extruded carbon rods produced according to the method of this invention and illustrates the manner in which they fracture;

Fig. 3 illustrates diagrammatically the manner in which the carbon granules produced according to the method of this invention haphazardly pack when they are placed in a suitable container; and Fig. 4 illustrates in cross section a carbon granule made according to the method of this invention provided with an internal opening located substantially centrally along the longitudinal axis of the original rod.

Referring to the drawing in detail, 10 is the driving wheel of a prime mover linked through a connecting rod 11 to a piston 12 moving within a cylinder 13. On the outstroke the piston 12 aspirates pressure fluid through line 14 and check valve 15 from the reservoir 16, and in the instroke the piston 12 discharges pressure fluid through check valve 17 and line 18 through 4-way valve 19 and line 20 to the forward end of the actuating cylinder 21 of the extrusion press. The rear end of the actuating cylinder 21 is connected through line 22 to the 4-way valve 19, and the 4-way valve 19 is connected through line 23 to the reservoir 16.

The 4-way valve 19 is actuated by a solenoid 24 connected to a source of electric power (not shown) through leads 25 and 26 and is actuated by a contactor 27 in response to the limit switch 28 or the limit switch 29 as the case might be.

The plunger 30 of the extrusion press is provided with a toggle 31 adapted to contact and actuate the limit switch 29 on its backward stroke and to contact and actuate the limit switch 28 on its forward stroke. The toggle 31 at the end of the backward stroke of the plunger 30 will close the limit switch 29 and energize the solenoid 24 through the contactor 27, while at the end of the forward stroke of the plunger 30 the toggle 31 will open the limit switch 28 and actuate the solenoid 24 through the means of the contactor 27.

The extrusion machine illustrated in Fig. 1 is provided with a hopper 32 and an extrusion chamber 33 provided with an extrusion die 34 having a plurality of openings thereon. A mixture of powdered carbon material and binder is stored in the hopper 32 and is caused to flow into and fill the extrusion chamber 33 as the plunger 30 moves on its backward stroke. As the backward stroke of the plunger 30 comes to an end, the toggle 31 closes the limit switch 29 and actuates the solenoid 24 through the contactor 27 and the 4-way valve 19 thus permits the flow of pressure fluid from the cylinder 13 through check valve 17 and lines 18 and 22 to the rear end of the actuating cylinder 21 in the extrusion apparatus. Since the pressure fluid is subjected to pulsating pressure, the forward movement of the plunger 30 will be intermittent or "jerky," and the rods extruded through the orifices on the die 34 will have substantially the configuration illustrated in Fig. 2 of the drawing.

As the plunger 30 completes its forward movement, the toggle 31 opens the limit switch 28 which actuates the solenoid 24 through the contactor 27, and pressure fluid then flows through the 4-way valve 19 from the cylinder 13 through check valve 17 and lines 18 and 20 into the forward end of the actuating cylinder 21 in the extrusion press to bring about the backward movement of the plunger 30.

As has been noted, the carbon rods produced according to the procedure above outlined, have the general configuration shown in Fig. 2. They comprise protuberances 35 lying between portions of lesser diameter 36, and when broken up each individual granule or agglomerate will consist of a portion of greater girth 37 flanked by portions of lesser girth 38. They may be provided with a central opening or channel 39 as illustrated in Fig. 4 by suitable arrangement of the die 34 on the extrusion chamber 33. In any event, the rods produced are broken up by tumbling, by cutting, or by any other suitable means along the portions of lesser diameter 36 as illustrated in Fig. 2, and, after activation, the carbon granules or agglomerates may be employed for whatever purpose they have been intended.

As will be noted from Fig. 3, the carbon granules which result from the practice of this invention, because of their particular shape, bring about thorough contact between themselves and any fluid flowing through a body of them. The degree of efficiency of contact which they provide is substantially greater than that provided by smooth, cylindrical rods of agglomerated carbon hitherto employed, and this greater efficiency is reflected in more complete removal of adsorbable matter in adsorption processes and in more complete conversion of reactants to desired product in catalytic processes.

It will be understood that while there have been described herein and illustrated in the drawing certain embodiments of the present invention, it is not intended thereby to have this invention limited to or circumscribed by the particular details of construction, arrangement of parts, products, procedures, or conditions herein described or illustrated in the drawing in view of the fact that this invention is susceptible to modifications according to individual preference and conditions without departing from the spirit of this disclosure and the scope of the annexed claims.

I claim:

1. In apparatus for extruding a rod having alternate areas of greater and lesser diameters, the combination of a source of pulsating pressure, an extrusion chamber, a piston movable in said extrusion chamber, means for applying said pressure to said piston, an extrusion die in said chamber, and means for admitting material to be extruded into said extrusion chamber, said source of pulsating pressure providing for an intermittent movement of said piston during one stroke.

2. In apparatus for extruding a rod having alternate areas of greater and lesser diameters, the combination of an extrusion chamber, an extrusion die in said chamber, hopper means in association with said chamber, piston means movable within said chamber, a pressure actuated cylinder in association with said piston, means for controlling flow of pressure fluid into and out of said pressure cylinder, said controlling means being automatically operated by the movement of said piston, means for delivering fluid pressure to said pressure cylinder, and means for providing intermittent fluid flow during each stroke of said piston.

3. In apparatus for extruding a rod having alternate areas of greater and lesser diameters, the combination of an extrusion chamber, an extrusion die in said chamber, hopper means in association with said chamber, a piston movable within said chamber, a pressure cylinder in association with said chamber, a piston movable within said chamber, a pressure cylinder in association with said piston, means for controlling the flow of fluid under pressure into and out of said cylinder, said controlling means being automatically operated by the movement of said piston, means for delivering fluid under pressure to said cylinder, means for providing intermittent fluid flow during each stroke of said pistons, and means for receiving fluid discharged from said cylinder.

4. In apparatus for extruding a rod having alternate areas of greater and lesser diameters, the combination of an extrusion chamber, an extrusion die in said chamber, hopper means in association with said chamber, a piston movable within said chamber, a pressure cylinder in association with said chamber, a piston movable within said chamber, a pressure cylinder in association with said piston, a source of pressure fluid, means for controlling the flow of fluid under pressure into and out of said cylinder, said controlling means being automatically operated by the movement of said piston, means for delivering fluid under pressure to said cylinder, means for providing intermittent fluid flow during each stroke of said pistons, and means for receiving fluid discharged from said cylinder.

E. L. LUACES.